(12) United States Patent
Wang et al.

(10) Patent No.: US 7,843,026 B2
(45) Date of Patent: Nov. 30, 2010

(54) COMPOSITE MATERIAL WITH CONDUCTIVE STRUCTURES OF RANDOM SIZE, SHAPE, ORIENTATION, OR LOCATION

(75) Inventors: Shih-Yuan Wang, Palo Alto, CA (US); Alexandre Bratkovski, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1380 days.

(21) Appl. No.: 11/290,685

(22) Filed: Nov. 30, 2005

(65) Prior Publication Data

US 2007/0120114 A1    May 31, 2007

(51) Int. Cl.
*H01L 33/58* (2010.01)
*H01L 31/0232* (2010.01)

(52) U.S. Cl. ............... 257/432; 252/587; 257/E31.127; 359/356; 385/142; 977/779; 977/834

(58) Field of Classification Search ................. 252/582, 252/587; 257/432, E31.127; 359/355, 356; 385/141, 142; 977/778, 779, 834
See application file for complete search history.

(56) References Cited

U.S. PATENT DOCUMENTS

| | | | |
|---|---|---|---|
| 6,465,132 B1 | 10/2002 | Jin | |
| 6,536,106 B1 | 3/2003 | Jackson et al. | |
| 6,741,019 B1 | 5/2004 | Filas et al. | |
| 6,791,432 B2 * | 9/2004 | Smith et al. | 333/99 S |
| 6,977,767 B2 * | 12/2005 | Sarychev et al. | 359/321 |
| 7,106,918 B2 * | 9/2006 | Bita et al. | 385/6 |
| 7,474,823 B2 * | 1/2009 | Wang et al. | 385/37 |
| 7,482,727 B2 * | 1/2009 | Bratkovski et al. | 310/300 |
| 7,492,329 B2 * | 2/2009 | Wang et al. | 343/909 |
| 7,593,170 B2 * | 9/2009 | Wu et al. | 359/719 |
| 2003/0042487 A1 | 3/2003 | Sarychev et al. | |
| 2005/0161630 A1 | 7/2005 | Chui et al. | |
| 2005/0221128 A1 * | 10/2005 | Kochergin | 428/824 |
| 2006/0003152 A1 * | 1/2006 | Youngs | 428/212 |
| 2006/0131695 A1 * | 6/2006 | Kuekes et al. | 257/618 |
| 2006/0152430 A1 * | 7/2006 | Seddon et al. | 343/909 |

FOREIGN PATENT DOCUMENTS

| | | |
|---|---|---|
| WO | WO 01/71774 | 9/2001 |
| WO | WO 03075291 A1 * | 9/2003 |
| WO | WO 2004/034504 | 4/2004 |
| WO | WO 2005/031864 A1 | 4/2005 |

OTHER PUBLICATIONS

R A Shelby et al-"Microwave transmission through a two-dimensional, isotropic, left-handed metamaterial"-Applied Physics Letters vol. 78 No. 4-Jan. 22, 2001-pp. 489-491.

Yannopapas, Vassilios, et. al., "Negative Refractive Index Metamaterials From Inherently Non-Magnetic Materials . . . ," J. Phys.:Condens. Matter 17 3717-3734 (2005).

(Continued)

*Primary Examiner*—Anh Phung
*Assistant Examiner*—Michael Lulis

(57) ABSTRACT

A composite material with at least one of a negative effective permittivity and a negative effective permeability for incident radiation of at least one wavelength is described. The composite material comprises conductive structures that are substantially random with respect to at least one of size, shape, orientation, and location.

30 Claims, 6 Drawing Sheets

OTHER PUBLICATIONS

Holloway, C. L., "A Double-Negative (DNG) Composite Medium Composed of Magnetodielectric . . . ," IEEE. Trans. Ant. & Prop., vol. 51, No. 10, 2596-2603 (Oct. 2003).

Zharov, A. A., et. al., "Suppression of Left-Handed Properties in Disordered Metamaterials," J. Appl. Phys. 97, 113906 (2005).

Felbacq, D., "Negative Refraction in Periodic and Random Photonic Crystals," New J. Physics 7 (2005) 159 (www.njp.org).

Zharov, A. A., et. al., "Birefringent Left-Handed Metamaterials and Perfect Lenses for Vectorial Fields," New J. Physics 7 (2005) 220 (www.njp.org).

Podolskiy, V., et. al., "Plasmon Modes and Negative Refraction in Metal Nanowire Composites," Optics Express, vol. 11, No. 7 735-745 (Apr. 7, 2003).

Hangarter, C., et. al., "Magnetic Alignment of Nanowires," Chem. Mater., vol. 17, No. 6, 1320-1324 (2005).

Kalaugher, L., "Nickel Nanowire Caps Lead to Manipulation," News—www.nanotechweb.org (Feb. 3, 2004).

Engheta, N., "Metamaterials with Negative Permittivity and Permeability: Background, Salient Features . . . ," IEEE MTT-S Int. Microwave Symp. Dig. 2003, vol. 1, 187-190 (2003).

\* cited by examiner

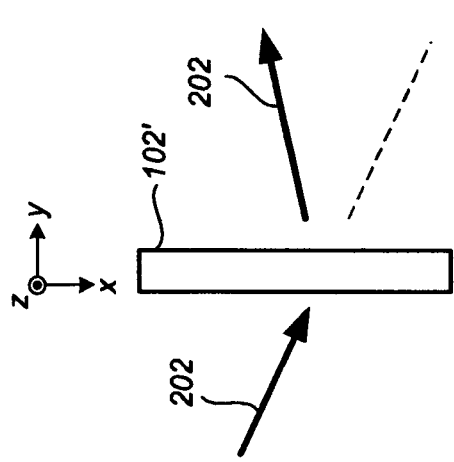
FIG. 1
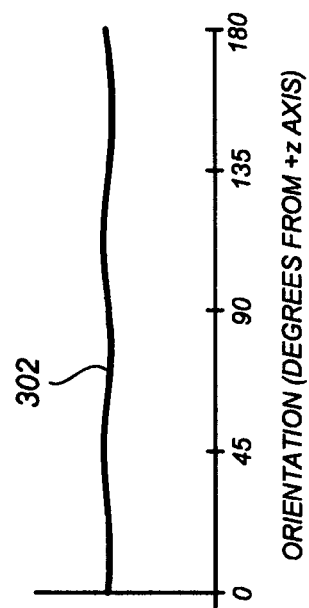
FIG. 2
FIG. 3

COMPOSITE MATERIAL WITH CONDUCTIVE STRUCTURES OF RANDOM SIZE, SHAPE, ORIENTATION, OR LOCATION

STATEMENT REGARDING FEDERALLY SPONSORED RESEARCH OR DEVELOPMENT

This invention has been made with government support under Contract No. HR0011-05-3-0002, awarded by Defense Advanced Research Projects Agency. The government has certain rights in the invention.

FIELD

This patent specification relates generally to the propagation of electromagnetic radiation and, more particularly, to composite materials capable of exhibiting negative effective permeability and/or negative effective permittivity with respect to incident electromagnetic radiation.

BACKGROUND

Substantial attention has been directed in recent years toward composite materials capable of exhibiting negative effective permeability and/or negative effective permittivity with respect to incident electromagnetic radiation. Such materials, often interchangeably termed artificial materials or metamaterials, generally comprise periodic arrays of electromagnetically resonant cells that are of substantially small dimension (e.g., 20% or less) compared to the wavelength of the incident radiation. Although the individual response of any particular cell to an incident wavefront can be quite complicated, the aggregate response the resonant cells can be described macroscopically, as if the composite material were a continuous material, except that the permeability term is replaced by an effective permeability and the permittivity term is replaced by an effective permittivity. However, unlike continuous materials, the resonant cells have structures that can be manipulated to vary their magnetic and electrical properties, such that different ranges of effective permeability and/or effective permittivity can be achieved across various useful radiation wavelengths.

Of particular appeal are so-called negative index materials, often interchangeably termed left-handed materials or negatively refractive materials, in which the effective permeability and effective permittivity are simultaneously negative for one or more wavelengths depending on the size, structure, and arrangement of the resonant cells. Potential industrial applicabilities for negative-index materials include so-called superlenses having the ability to image far below the diffraction limit to λ/6 and beyond, new designs for airborne radar, high resolution nuclear magnetic resonance (NMR) systems for medical imaging, and microwave lenses.

One issue that arises in the realization of useful devices from such composite materials, including negative index materials, relates to the practical manufacturability of devices when precise dimensioning and positioning of the resonant cells is required, especially for devices operable at optical frequencies requiring very small resonator dimensions. Another issue relates to achieving isotropic behavior in two or three dimensions, such isotropy often being desirable for many practical applications. Another issue relates to substantial losses experienced by the incident electromagnetic signal when propagating through the composite material. Other issues arise as would be apparent to one skilled in the art upon reading the present disclosure.

SUMMARY

In accordance with an embodiment, a composite material with at least one of a negative effective permittivity and a negative effective permeability for incident radiation of at least one wavelength is provided. The composite material comprises conductive structures that are substantially random with respect to at least one of size, shape, orientation, and location. The conductive structures have minor dimensions less than about one fiftieth of the incident radiation wavelength.

Also provided is a composite material with at least one of a negative effective permittivity and a negative effective permeability for incident radiation of at least one wavelength, comprising a matrix material and a plurality of conductive structures disposed in the matrix material. The conductive structures are substantially random with respect to at least one of size, shape, orientation, and location and have minor dimensions substantially smaller than the incident radiation wavelength. The matrix material exhibits gain in an amplification band that includes the incident radiation wavelength.

Also provided is a method for propagating incident electromagnetic radiation at an operating wavelength, comprising placing a composite material in the path of the incident electromagnetic radiation, the composite material having at least one of a negative effective permittivity and a negative effective permeability at the operating wavelength. The composite material comprises conductive structures that are substantially random with respect to at least one of size, shape, orientation, and location and have minor dimensions less than about one-fiftieth of the operating wavelength.

Also provided is a method for propagating incident electromagnetic radiation at an operating wavelength, comprising placing a composite material in the path of the incident electromagnetic radiation, the composite material having at least one of a negative effective permittivity and a negative effective permeability at the operating wavelength. The composite material comprises a plurality of conductive structures disposed in a matrix material that exhibits gain at the operating wavelength. The conductive structures are substantially random with respect to at least one of size, shape, orientation, and location and have minor dimensions substantially smaller than the operating wavelength.

Also provided is a device for propagating incident radiation at an operating wavelength, comprising a matrix material and a plurality of conductive structures disposed in the matrix material. The conductive structures are substantially random with respect to at least one of size, shape, orientation, and location and have minor dimensions substantially smaller than the incident radiation wavelength such that at least one of a negative effective permittivity and a negative effective permeability are exhibited at the operating wavelength. The device further comprises means disposed in the matrix material for providing gain at the operating wavelength. The device further comprises means for powering the gain providing means.

BRIEF DESCRIPTION OF THE DRAWINGS

FIG. 1 illustrates a perspective view of a composite material according to an embodiment;

FIG. 2 illustrates a top view of a composite material according to an embodiment;

FIG. 3 illustrates an orientation distribution corresponding to the embodiment of FIG. 1;

DETAILED DESCRIPTION

Figure 5:
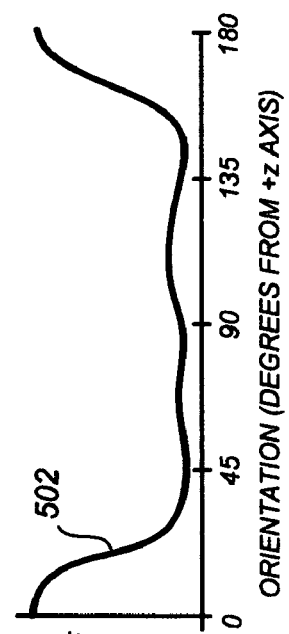
FIG. 5 illustrates an orientation distribution corresponding to the embodiment of FIG. 4.

FIG. 1 illustrates a perspective view of a composite material 102 according to an embodiment, comprising a population of conductive structures 104 disposed in a matrix material 103. Although the conductive structures 104 comprise cylindrical shells 104a and rods 104b in the embodiment of FIG. 1, a variety of different structural shapes and sizes can be used for other embodiments, with further non-limiting examples being described infra. Each of the conductive structures 104 can be at least partially characterized by a minor dimension, a major dimension, and an aspect ratio, the minor dimension corresponding to a shortest side of an imaginary best-fitting rectangular solid placed around the conductive structure 104, the major dimension corresponding to the longest side, and the aspect ratio being the ratio between the major and minor dimensions. By way of example, each of the cylindrical shells 104a and rods 104b has a minor dimension that is the lesser of its diameter and its axial length and a major dimension that is the greater of its diameter and its axial length.

According to an embodiment, the conductive structures 104 have minor dimensions that are less that about 1/50 of the wavelength for which the negative effective permittivity and/or negative effective permeability is desired, termed herein the operating wavelength. By way of example and not by way of limitation, for an operating wavelength of 600 nm in the optical range, the minor dimensions should be less than about 12 nm. For an operating wavelength of 1.55 µm in the near infrared range, the minor dimensions should be less than about 31 nm. For an operating wavelength of 10 µm in the far infrared range, the minor dimensions should be less than about 200 nm. For an operating wavelength of 1 mm in the microwave range, the minor dimensions should be less than about 20 µm. For an operating wavelength of 10 cm in the microwave range, the minor dimensions should be less than about 2 mm.

According to another embodiment, the conductive structures 104 have minor dimensions that are less that about 1/100 of the operating wavelength. According to another embodiment, the conductive structures 104 have minor dimensions that are less that about 1/1000 of the operating wavelength. For one embodiment, aspect ratios of the conductive structures 104 can range from 10:1 to 20:1. For another embodiment, aspect ratios of the conductive structures 104 can range from 1:1 (e.g., for spheres) to 20:1. For yet another embodiment, aspect ratios of the conductive structures 104 can range from 1:1 to 100:1. For still another embodiment, aspect ratios of the conductive structures 104 can range from 1:1 to more than 100:1.

According to one embodiment, between 25 percent and 75 percent of the conductive structures are elongate with aspect ratios greater than about 5:1. According to another embodiment, between 0 percent and 100 percent of the conductive structures are elongate with aspect ratios greater than about 5:1.

Preferably, the conductive structures 104 are substantially random with respect to at least one of size, shape, orientation, and location. In the particular example of FIG. 1, the conductive structures 104 are random with respect to their orientation and their location. The probability distribution describing the random size, shape, orientation, or location can be flat or can contain one or more modes (e.g., unimodal, bimodal, trimodal, etc.) depending on the particular desired characteristics.

In one embodiment, the conductive structures 104 comprise one or more metals such as silver, gold, platinum, copper, cobalt, nickel, or aluminum. It is to be appreciated, however, that the composition of conductive structures 104 is not limited to metals, but can generally include any material capable of supporting plasmon and/or polariton resonance through the effects of surface charge density variations at the frequency for which the negative effective permittivity and/or negative effective permeability is desired. Thus, for example, for optical, near-infrared, and far-infrared frequencies, the conductive structures 104 can comprise materials such as metallic carbon nanotubes, aluminum oxide, and doped semiconductor materials such as InP. The conductive structures 104 can optionally comprise multiple layers of material, such as metallic layers interleaved with semiconductor or dielectric layers.

The matrix material 103 is preferably non-conducting and relatively transparent at the operating wavelength. The matrix material 103 should also be capable of physically supporting and/or suspending the conductive structures 104 therein to have the required locations or statistical distribution of locations, as well as the required orientations or statistical distribution of orientations. Where static (i.e., time-invariant) locations and orientations are desired, the matrix material 103 should comprise a solid or semi-solid material. Where time-varying locations and orientations are permissible, the matrix material may comprise a liquid or semi-liquid that maintains the conductive structures 104 in suspension. By way of non-limiting example, for operating wavelengths in the optical or near-infrared range, the matrix material 103 may comprise $SiO_2$ or an undoped semiconductor material. For operating wavelengths in the far-infrared range, the matrix material 103 may comprise NaCl or ZnSe. For operating wavelengths in the microwave range, suitable matrix materials may comprise polystyrene foam.

FIG. 2 illustrates a top view of a composite material 102' that includes the block of composite material 102 shown in FIG. 1. It is to be appreciated, of course, that the close-in view of FIG. 1 represents only a tiny fraction of the operating wavelength, and so a much larger block of such material, as represented by the composite material 102' of FIG. 2, is usually necessary in practical applications. The composite material 102' has been placed in the path of propagating electromagnetic radiation 202 in FIG. 2 and causes it to be negatively refracted while propagating therethrough.

Generally speaking, the desired negative effective permittivity and/or negative effective permeability are exhibited at operating wavelengths and propagation directions for which a sufficiently large sub-population of the conductive structures 104 collectively bring about the required plasmon and/or polariton resonance conditions. Thus, for the example of FIG. 2 in which the electromagnetic radiation 202 is approaching at a non-normal angle in the x-y plane, and again recalling that the conductive structures 104 are extremely small compared to the operating wavelength (e.g., 1/50 or less), there are statistically enough of the conductive structures 104 oriented closely enough to the +z direction and of appropriate sizes and relative distances with respect to the operating wavelength such the required plasmon and/or polariton resonance conditions are brought about and the electromagnetic radiation 202 is negatively refracted. Among other advantages, a substantial degree of isotropic behavior is provided, as well as a substantial degree of polarization insensitivity.

FIG. 3 illustrates an orientation distribution 302 corresponding to the composite material 102 of FIG. 1. The orientations represented in FIG. 3 are expressed as angles with respect to the +z axis. As illustrated by the flat probability distribution, there are no preferred orientations. Accordingly, the response of the composite material 102 will be substantially isotropic, i.e., the negative effective permittivity and/or negative effective permeability that is experienced by the propagating radiation will be the same for all propagation directions.

Figure 4:
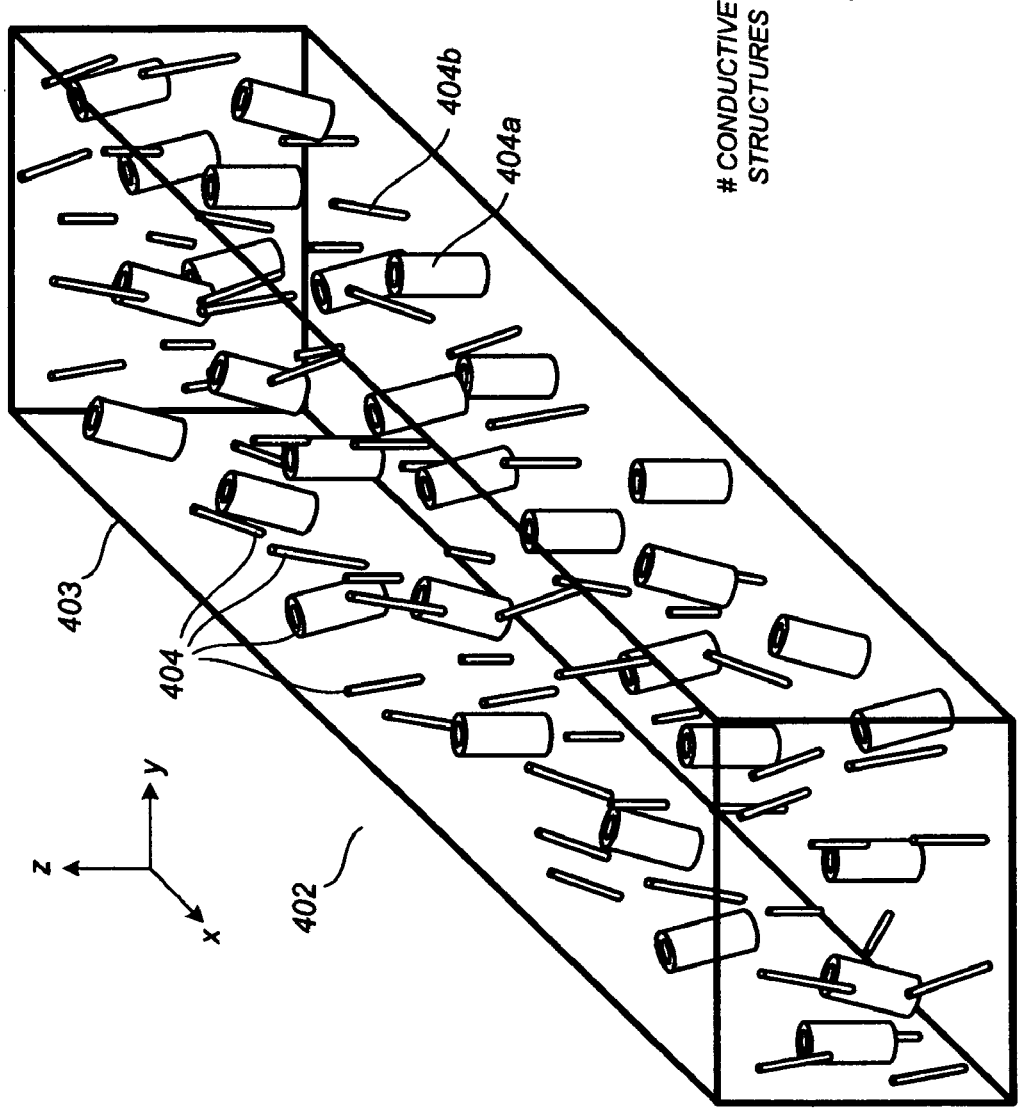
FIG. 4 illustrates a perspective view of a composite material according to an embodiment.

FIG. 4 illustrates a perspective view of a composite material 402 according to an embodiment, comprising a population of conductive structures 404 disposed in a matrix material 403, the conductive structures 404 comprising cylindrical shells 404a and rods 404b. FIG. 5 illustrates an orientation distribution 502 corresponding to the composite material 402 of FIG. 4. As illustrated by the unimodal probability distribution 502, there is a statistical preference toward the +z direction. The response of the composite material 402 will be at least partially anisotropic, with the negative effective permittivity and/or negative effective permeability being emphasized for radiation propagation paths that are parallel or near-parallel to the x-y plane. In one embodiment, at least 50% of said conductive structures are oriented within 45 degrees of the +z direction. The statistical preference of the conductive structures 404 toward a preferred orientation can be achieved using known methods during fabrication, just as by the application of an aligning electromagnetic field during a solution curing step.

Figure 6:
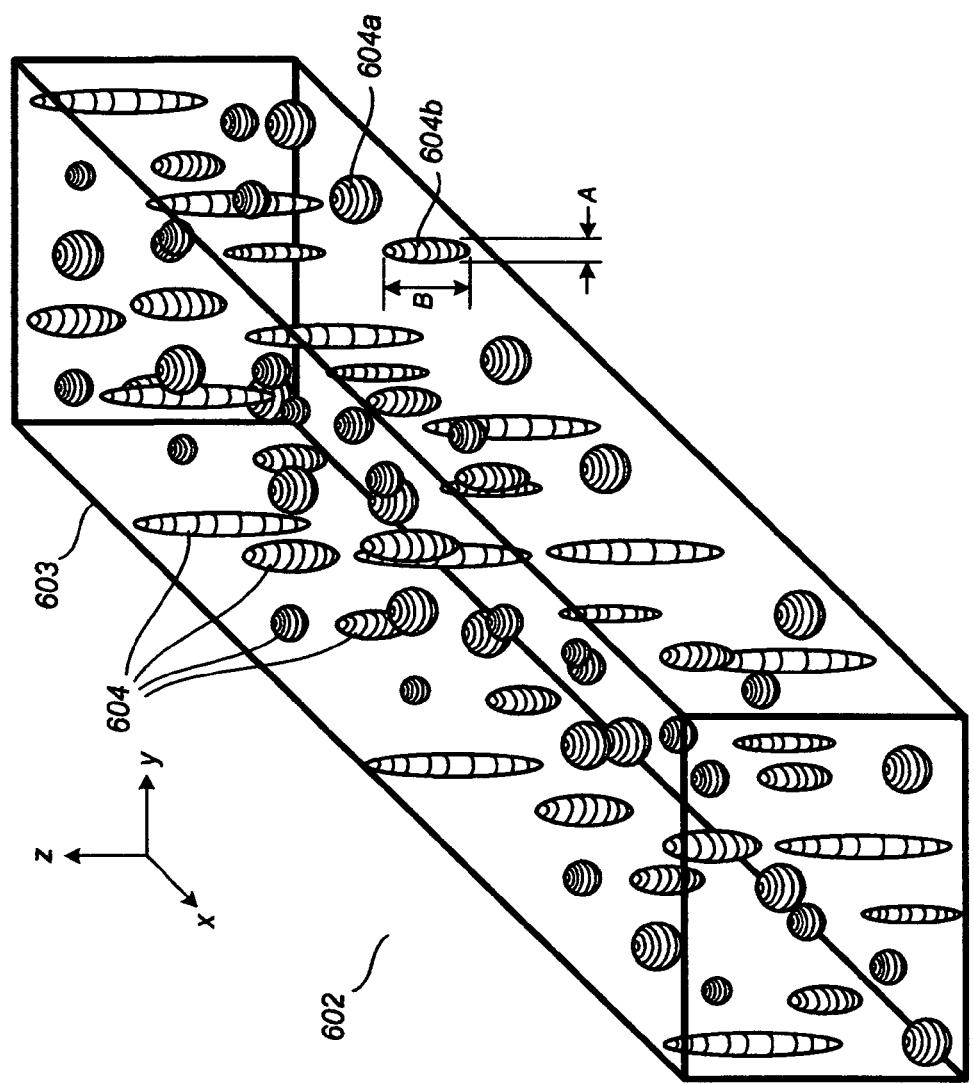
FIG. 6 illustrates a perspective view of a composite material according to an embodiment.

FIG. 6 illustrates a perspective view of a composite material 602 according to an embodiment, comprising a population of conductive structures 604 disposed in a matrix material 603, the conductive structures 604 comprising spheroidal structures 604a and elongate ellipsoidal structures 604b. As used herein, spheroidal structure refers generally to ball-shaped or slightly egg-shaped structures and irregular variants thereof having aspect ratios less than about 2:1. As used herein, elongate structure refers generally to structures having aspect ratios greater than about 2:1. Thus, for example, in addition to the elongate ellipsoidal structures 604b of FIG. 1, any of the cylindrical shells 104a and rods 104b having aspect ratios of about 2:1 or greater are elongate structures as that term is used herein. FIG. 6 also illustrates an example of a major "B" and minor dimension "A" for the elongate structures 604b, with their aspect ratio being B/A.

Generally speaking, the presence of linear conductive paths, as may be provided by the elongate structures described herein, serves to facilitate or strengthen a negative effective permittivity of the composite material, especially for radiation propagating in directions at least roughly perpendicular to the direction of the linear currents. Generally speaking, the presence of circular or ring-like conductive paths, as may be provided by the spheroidal structures described herein as well as many elongate structures, serves to facilitate or strengthen a negative effective permeability of the composite material, especially for radiation propagating in directions at least roughly parallel to the planes of the circular or ring-like currents.

Figure 7:
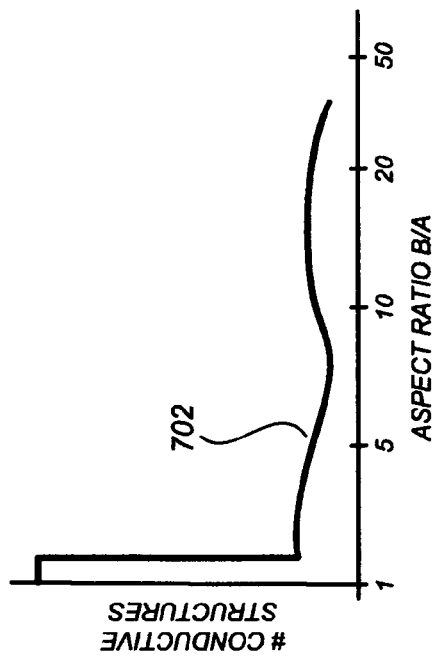
FIG. 7 illustrates an aspect ratio distribution corresponding to the embodiment of FIG. 6.

FIG. 7 illustrates a shape distribution 702 corresponding to the aspect ratios B/A of the conductive structures 604 of the composite material 602 of FIG. 6. There is a substantial mode near the 1:1 aspect ratio due to the many spheroidal structures 604a contained in the composite material 602.

Figure 8:
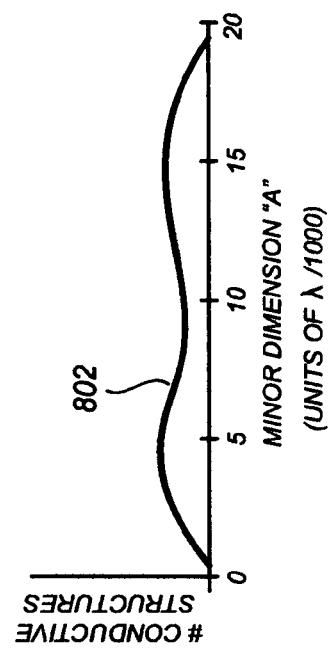
FIG. 8 illustrates a minor dimension distribution corresponding to the embodiment of FIG. 6.

FIG. 8 illustrates a size distribution 802 corresponding to the minor dimension "A" of the conductive structures 604 of the composite material 602 of FIG. 6, which vary, by way of non-limiting example, between $\lambda/1000$ and $\lambda/50$, where $\lambda$ is the operating wavelength. Thus, the conductive structures 604 of FIG. 6 are substantially random with respect to their size, shape, and location, but are not random with respect to their orientation, which is purely vertical in the +z direction.

Figure 10:
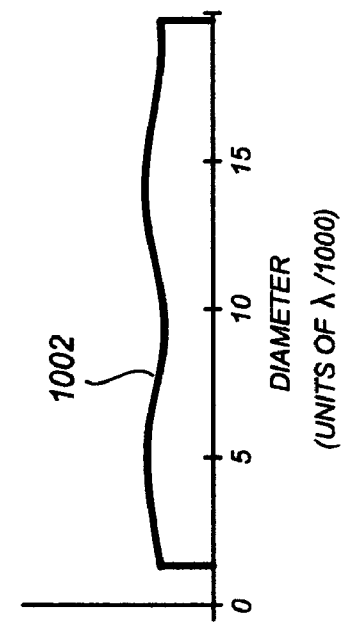
FIG. 10 illustrates a minor dimension (diameter) distribution corresponding to the embodiment of FIG. 9.
Figure 9:
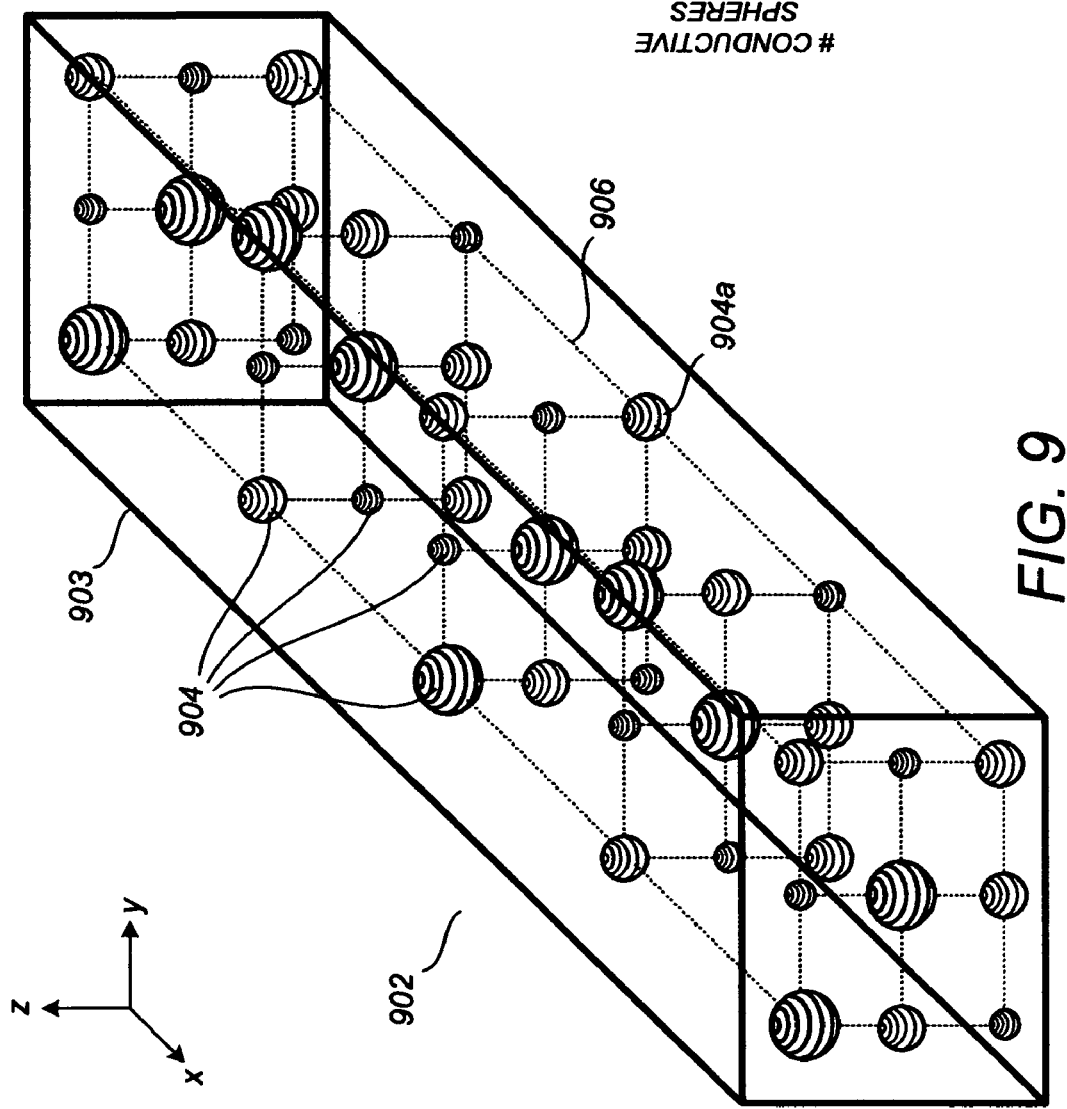
FIG. 9 illustrates a perspective view of a composite material according to an embodiment.

FIG. 9 illustrates a perspective view of a composite material 902 according to an embodiment, comprising a population of conductive structures 904 disposed in a matrix material 903, the conductive structures 904 comprising spheres 904a placed at the vertices of a regular periodic pattern 906. FIG. 10 illustrates a size distribution 1002 corresponding to the composite material 902 of FIG. 9. For this example, the conductive structures 904 are substantially random with respect to their size, but are not random with respect to their shape or location.

Figure 11:
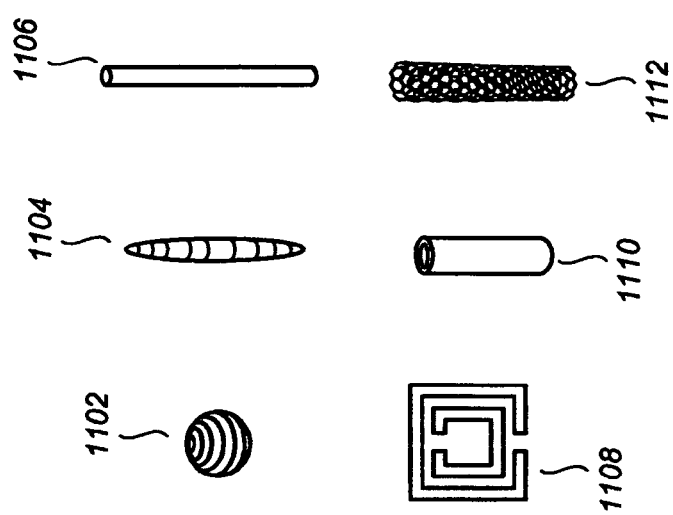
FIG. 11 illustrates examples of conductive structures that can be incorporated into a composite material according to an embodiment.

FIG. 11 illustrates some examples of the many kinds of conductive structure shapes that can be used in accordance with one or more of the embodiments, including spheres 1102, elongated ellipsoids 1104, rods or wires 1106, split-ring resonators 1108, and cylindrical shells 1110. For operating wavelengths in the optical, near-infrared, and far-infrared ranges, the shapes of FIG. 11 can generally be referenced as nanostructures, i.e., nanospheres 1102, elongate nanoellipsoids 1104, nanorods or nanowires 1106, split-ring resonators 1108, nanocylinders 1110. For operating wavelengths in the optical, near-infrared, and far-infrared ranges, metallic carbon nanotubes 1112 can also be used. For shapes that are two-dimensional (i.e., planar) such as the split ring resonator 1108, the minor and major dimensions are in a single plane and the aspect ratio is the ratio of the major dimension to the minor dimension. For operating wavelengths in the optical, near-infrared, far-infrared, and microwave ranges, swiss roll structures can also be used.

Figure 12:
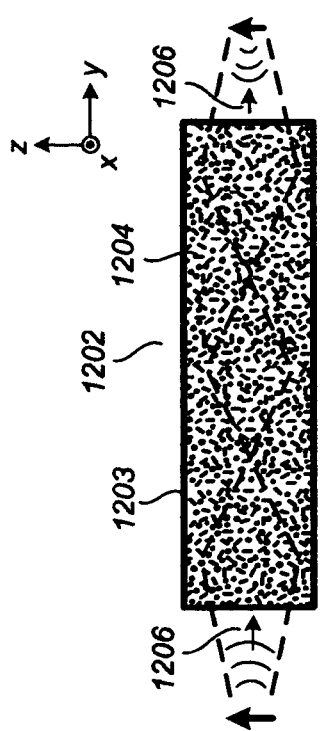
FIG. 12 illustrates a waveguiding structure comprising a composite material according to an embodiment.

FIG. 12 illustrates a waveguiding structure 1202 formed from a composite material 1203 comprising conductive structures 1204 according to an embodiment. Electromagnetic radiation 1206 at the operating wavelength propagates through the waveguiding structure 1202.

Figure 13:
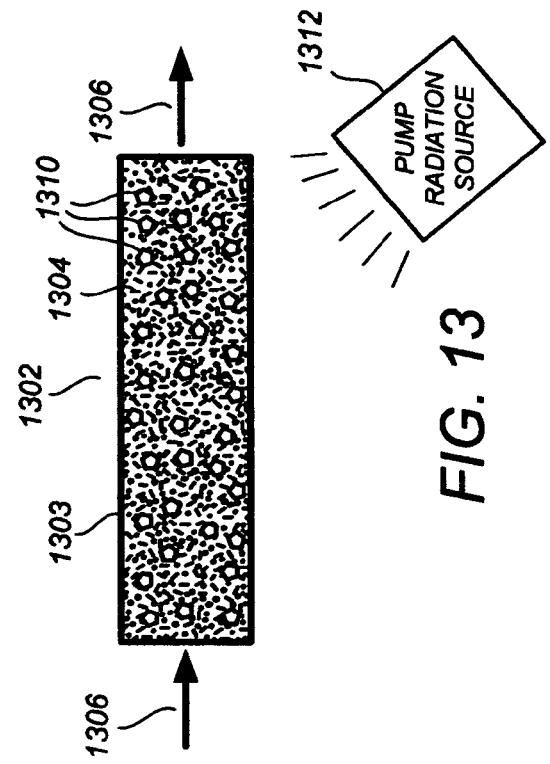
FIG. 13 illustrates an optical device according to an embodiment.

FIG. 13 illustrates a waveguiding structure 1302 formed from a composite material 1303 comprising conductive structures 1304 according to an embodiment. To reduce losses and/or to introduce gain for the propagating radiation 1306 at the operating wavelength, the composite material 1303 comprises a matrix material exhibiting gain in an amplification band that includes the operating wavelength, and a pump radiation source 1312 provides pump light to the matrix material. By way of example and not by way of limitation, for operating wavelengths in the optical, near-infrared, and far-infrared ranges, the matrix material can comprise quantum dots 1310 that absorb pump radiation in a first frequency range and emit radiation in a second frequency range, the second frequency range including the operating wavelength.

It is to be appreciated, however, that a variety of different gain materials or mechanisms can be used to introduce the desired gain into the propagating radiation without departing from the scope of the present teachings. By way of example, for one embodiment in which the operating wavelength corresponds to one of an optical, near-infrared, and far infrared frequency range, the matrix material can be doped with rare earth ions such erbium, yttrium, neodymium, or praseodymium ions that provide gain when optically pumped. In another example, the composite material 1303 further comprises a quantum well gain material having an amplification band that includes the operating wavelength, the quantum well gain material being conformally grown around each of said conductive structures 1304. In yet another example, for operating wavelengths in the microwave frequency range, the composite material can comprise tiny optically powered integrated circuit microwave amplifier chips distributed throughout, the amplifier chips comprising photodiodes that convert pump radiation into electrical power, the electrical power being used to drive the amplifier circuitry that amplifies the propagating microwave radiation.

Figure 14:
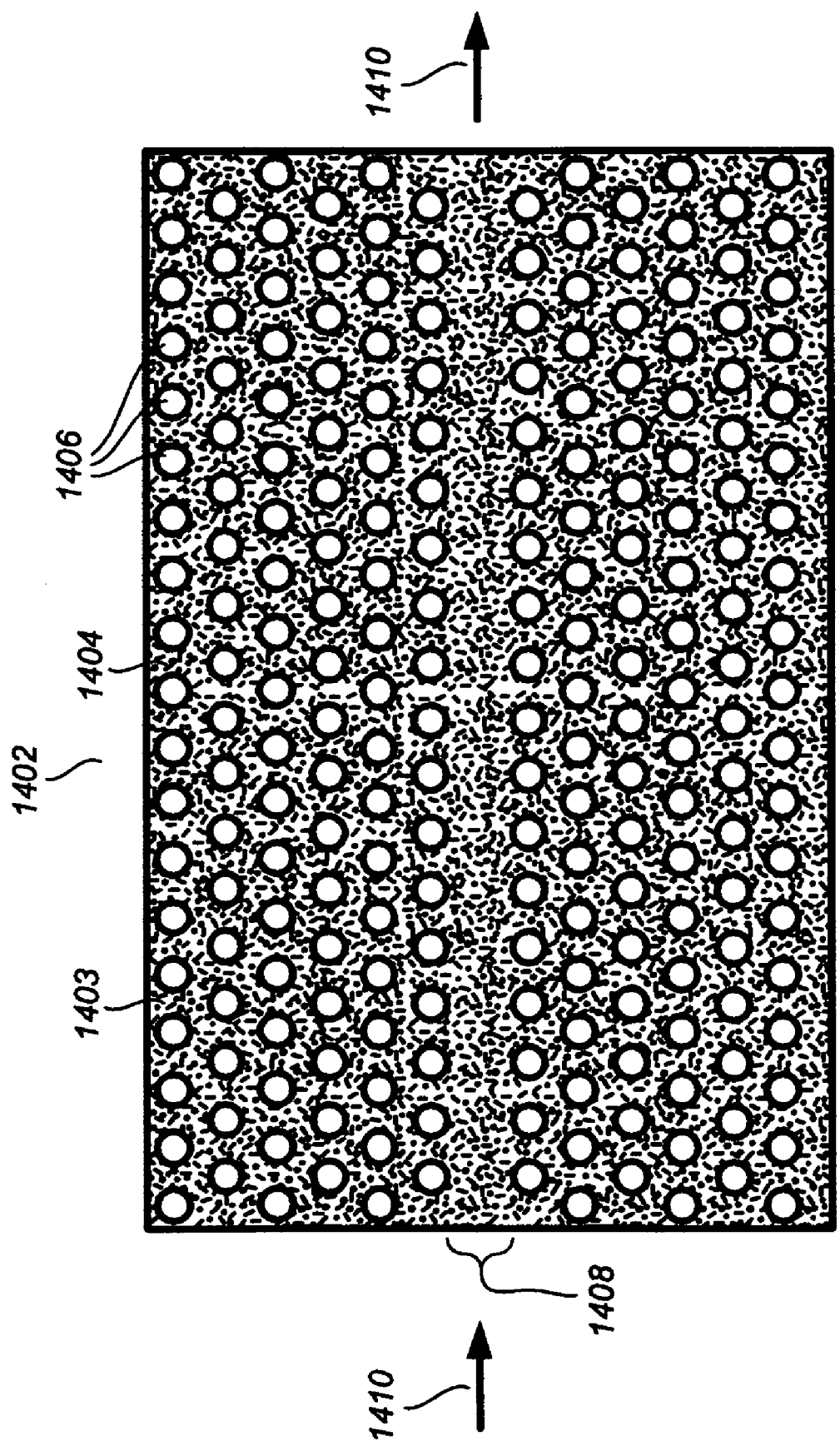
FIG. 14 illustrates a photonic crystal structure according to an embodiment.

FIG. 14 illustrates a top view of a photonic crystal structure 1402 formed from a composite material 1403 comprising conductive structures 1404 according to an embodiment. The composite material 1403 can optionally be configured to provide gain at the operating wavelength in a manner similar to that described for FIG. 13, supra. An ordered pattern of air or dielectric holes 1406 are formed in the composite material 1403 such that a photonic bandgap is exhibited that includes the operating wavelength of the propagating radiation 1410.

Although the air or dielectric holes 1406 are subwavelength structures, they will generally be substantially larger than the minor dimensions of the conductive structures 1404. By way of example, whereas the minor dimensions of the conductive structures 1404 will often be on the order of $\lambda/50$ or less in size, the air or dielectric holes 1406 will be on the order of $\lambda/3$ in diameter. Optionally, a defect waveguide 1408 is formed by omitted holes or other variations to the periodic pattern, as illustrated in FIG. 14, such that the radiation at the operating wavelength will propagate down the defect waveguide 1408.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while some embodiments supra are described in the context of negative-index materials, the features and advantages of the embodiments are readily applicable in the context of so-called indefinite materials in which the permeability and permittivity are of opposite signs. By way of further example, a randomized or partially randomized composite material similar to that of some embodiments supra can be implemented as a portion of a larger composite material having other non-random components.

By way of still further example, various parameters such as pump energies, pump frequencies, per-side dimensions, and conductive structure directionalities can be modulated in real-time or near-real time for achieving any of a variety of different useful results. By way of even further example, the air or dielectric holes of a photonic crystal structure formed from a first type of composite material having a first type of conductive structures can be occupied instead by a second type of composite material having a second type of conductive structures. Thus, reference to the details of the described embodiments are not intended to limit their scope.

What is claimed is:

1. A composite material with at least one of a negative effective permittivity and a negative effective permeability for incident radiation of at least one wavelength comprising conductive structures that are substantially random with respect to at least one of size, shape, orientation, and location and that have a minor dimension less than about one fiftieth of said incident radiation wavelength, wherein said incident radiation wavelength corresponding to one of an optical, near-infrared, and far infrared frequency range, said composite material further comprising a quantum well gain material having an amplification band that includes said incident radiation wavelength, said quantum well gain material being conformally grown around each of said conductive structures.

2. The composite material of claim 1, wherein said minor dimension is less than about $1/100$ of said incident radiation wavelength.

3. The composite material of claim 1, wherein said minor dimension is less than about $1/1000$ of said incident radiation wavelength.

4. The composite material of claim 1, wherein said conductive structures have substantially random orientations with a statistical preference toward a first orientation at least roughly perpendicular to a direction of propagation of radiation at said incident radiation wavelength, and wherein at least 50% of said conductive structures are oriented within 45 degrees of said first orientation.

5. The composite material of claim 1, wherein said incident radiation wavelength corresponds to one of an optical, near-infrared, and far infrared frequency range and said conductive structures comprise nanostructures selected from the group consisting of metallic carbon nanotubes, nanocylinders, nanorods, nanospheres, elongate nanostructures, swiss rolls, and split-ring resonators.

6. The composite material of claim 1, wherein between 25 percent and 75 percent of said conductive structures are elongate with aspect ratios greater than about 5:1.

7. The composite material of claim 1, wherein said conductive structures are distributed in a matrix material, wherein said matrix material and said conductive structures therein are formed into one of a waveguiding structure and a photonic crystal structure having a photonic bandgap that includes said incident radiation wavelength.

8. A composite material with at least one of a negative effective permittivity and a negative effective permeability for incident radiation of at least one wavelength, comprising:
   a matrix material; and
   a plurality of conductive structures disposed in said matrix material, said conductive structures being substantially random with respect to at least one of size, shape, orientation, and location and having a minor dimension substantially smaller than said incident radiation wavelength;
   wherein said matrix material exhibits gain in an amplification band that includes said incident radiation wavelength.

9. The composite material of claim 8, wherein said incident radiation wavelength corresponds to one of an optical, near-infrared, and far infrared frequency range, and wherein said matrix material comprises at least one of a rare earth ion doped material and a quantum dot gain material, said quantum dot gain material comprising quantum dots having amplification bands that include said incident radiation wavelength.

10. The composite material of claim 8, wherein said incident radiation wavelength corresponds to a microwave frequency range, and wherein said matrix material comprises optically powered integrated circuit microwave amplifiers distributed in the matrix material.

11. The composite material of claim 8, wherein (A) said incident radiation wavelength corresponds to one of an optical, near-infrared, and far infrared frequency range and said conductive structures comprise nanostructures selected from the group consisting of metallic carbon nanotubes, nanocylinders, nanorods, nanospheres, elongate nanostructures, swiss rolls, and split-ring resonators, or (B) said incident radiation wavelength corresponds to a microwave frequency range and said conductive structures comprise metallic structures selected from the group consisting of cylinders, rods, spheres, elongate structures, swiss rolls, and split-ring resonators.

12. The composite material of claim 8, wherein said minor dimension is less than about one fiftieth of said incident radiation wavelength.

13. The composite material of claim 8, wherein said matrix material and said conductive structures therein are formed into a photonic crystal structure having a photonic bandgap that includes said incident radiation wavelength, said photonic crystal structure defining a defect waveguide propagating radiation at said incident radiation wavelength therealong.

14. A method for propagating incident electromagnetic radiation at an operating wavelength, comprising placing a composite material in the path of the incident electromagnetic radiation, the composite material having at least one of a negative effective permittivity and a negative effective permeability at said operating wavelength, the composite material comprising conductive structures that are substantially random with respect to at least one of size, shape, orientation, and location and that have a minor dimension less than about one-fiftieth of said operating wavelength, wherein said operating wavelength corresponding to one of an optical, near-infrared, and far infrared frequency rang, said composite material further comprising a quantum well gain material having an amplification band that includes said operating wavelength, said quantum well gain material being conformally grown around each of said conductive structures.

15. The method of claim 14, wherein said minor dimension is less than about 1/100 of said operating wavelength.

16. The method of claim 14, wherein said minor dimension is less than about 1/1000 of said operating wavelength.

17. The method of claim 14, wherein said conductive structures have substantially random orientations with a statistical preference toward a first orientation at least roughly perpendicular to a direction of propagation of the electromagnetic radiation, and wherein at least 50% of said conductive structures are oriented within 45 degrees of said first orientation.

18. The method of claim 14, wherein said operating wavelength corresponds to one of an optical, near-infrared, and far infrared frequency range and said conductive structures comprise nanostructures selected from the group consisting of metallic carbon nanotubes, metallic nanocylinders, metallic nanorods, metallic nanospheres, elongate metallic nanostructures, metallic swiss rolls, and metallic split-ring resonators.

19. The method of claim 14, wherein between 25 percent and 75 percent of said conductive structures are elongate with aspect ratios greater than about 5:1.

20. The method of claim 14, wherein said conductive structures are distributed in a matrix material, wherein said matrix material and said conductive structures therein are formed into one of (A) a waveguiding structure, and (B) a photonic crystal structure having a photonic bandgap that includes said operating wavelength.

21. A method for propagating incident electromagnetic radiation at an operating wavelength, comprising placing a composite material in the path of the incident electromagnetic radiation, the composite material having at least one of a negative effective permittivity and a negative effective permeability at the operating wavelength, the composite material comprising a plurality of conductive structures disposed in a matrix material that exhibits gain at said operating wavelength, said conductive structures being substantially random with respect to at least one of size, shape, orientation, and location and having a minor dimension substantially smaller than said operating wavelength.

22. The method of claim 21, wherein said operating wavelength corresponds to one of an optical, near-infrared, and far infrared frequency range, and wherein said matrix material comprises at least one of a rare earth ion doped material and a quantum dot gain material, said quantum dot gain material comprising quantum dots having amplification bands that include said operating wavelength, and wherein the method further comprises providing pump radiation to the matrix material.

23. The method of claim 21, wherein said operating wavelength corresponds to a microwave frequency range, and wherein said matrix material comprises a plurality of optically powered integrated circuit microwave amplifiers, and wherein the method further comprises providing pump radiation to the matrix material.

24. The method of claim 21, wherein (A) said operating wavelength corresponds to one of an optical, near-infrared, and far infrared frequency range and said conductive structures comprise nanostructures selected from the group consisting of metallic carbon nanotubes, metallic nanocylinders, metallic nanorods, metallic nanospheres, elongate metallic nanostructures, metallic swiss rolls, and metallic split-ring resonators, or (B) said operating wavelength corresponds to a microwave frequency range and said conductive structures comprise metallic structures selected from the group consisting of cylinders, rods, spheres, elongate structures, swiss rolls, and split-ring resonators.

25. The method of claim 21, wherein said minor dimension is less than about 1/100 of said operating wavelength.

26. The method of claim 21, wherein said matrix material and said conductive structures therein are formed into a photonic crystal structure having a photonic bandgap that includes said operating wavelength, said photonic crystal structure defining a defect waveguide propagating said electromagnetic radiation at said operating wavelength therealong.

27. A device fin propagating incident radiation at an operating wavelength, comprising:
    a matrix material;
    a plurality of conductive structures disposed in said matrix material, said conductive structures being substantially random with respect to at least one of size, shape, orientation, and location and having a minor dimension substantially smaller than said incident radiation wavelength such that at least one of a negative effective permittivity and a negative effective permeability are exhibited at said operating wavelength;
    means disposed in said matrix material for providing gain at said operating wavelength; and
    means for powering said means for providing gain.

28. The device of claim 27, wherein said operating wavelength corresponds to one of an optical, near-infrared, and far infrared frequency range, wherein said means for powering comprises a pump radiation source configured to project pump radiation toward said matrix material, and wherein said means for providing gain comprises one of (A) a rare earth ion doped material, (B) a plurality of quantum dots having amplification bands that include said operating wavelength, and (C) a quantum well gain material conformally grown around each of said conductive structures.

29. The device of claim 27, wherein said operating wavelength corresponds to a microwave frequency range, wherein said means for powering comprises a pump radiation source configured to project optical pump radiation toward said matrix material, and wherein said means for providing gain comprises a plurality of optically powered integrated circuit microwave amplifiers dispersed throughout said matrix material.

30. The device of claim 27, wherein said minor dimension is less than about one fiftieth of said operating wavelength.

* * * * *

UNITED STATES PATENT AND TRADEMARK OFFICE
CERTIFICATE OF CORRECTION

PATENT NO. : 7,843,026 B2  
APPLICATION NO. : 11/290685  
DATED : November 30, 2010  
INVENTOR(S) : Shih-Yuan Wang et al.

Page 1 of 1

It is certified that error appears in the above-identified patent and that said Letters Patent is hereby corrected as shown below:

In column 8, line 8, in Claim 1, after "wavelength," delete "wherein".

In column 9, line 34, in Claim 14, after "wavelength," delete "wherein".

In column 9, line 36, in Claim 14, delete "rang," and insert -- range, --, therefor.

In column 10, line 49, in Claim 27, delete "fin" and insert -- for --, therefor.

Signed and Sealed this  
Fifth Day of April, 2011

David J. Kappos  
*Director of the United States Patent and Trademark Office*